Sept. 14, 1954     S. MUSIKANT     2,689,122
SHOCK MOUNTING
Filed Feb. 23, 1952
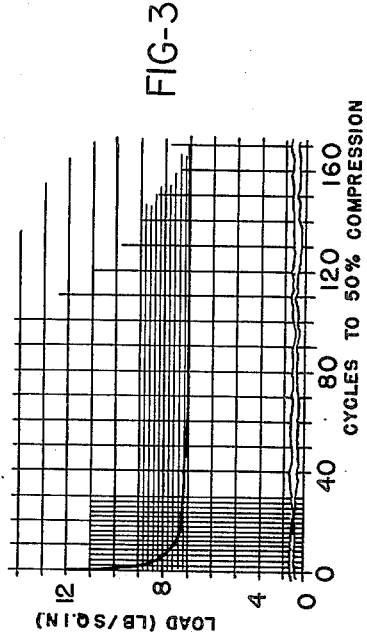
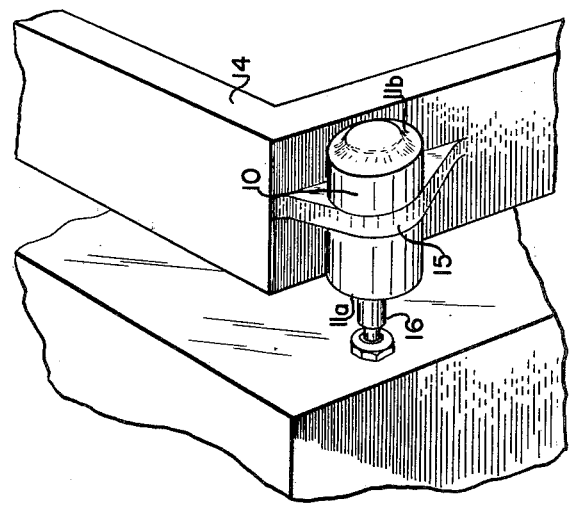
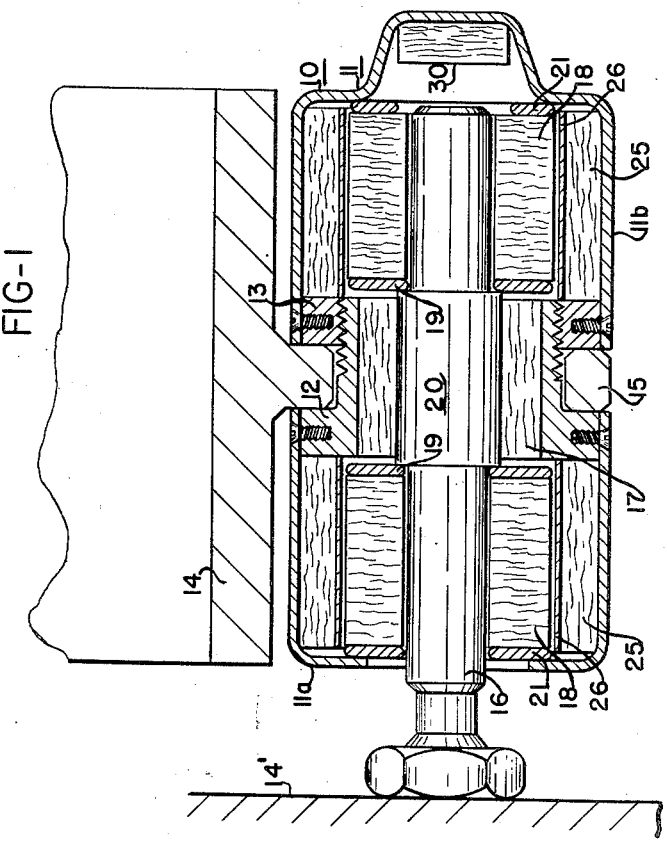
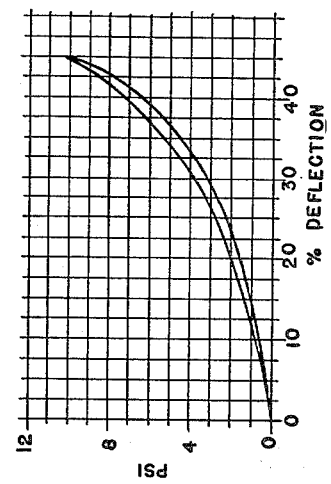
INVENTOR
SOLOMON MUSIKANT
BY *Toulmin Toulmin*
ATTORNEYS

Patented Sept. 14, 1954

2,689,122

UNITED STATES PATENT OFFICE 2,689,122

SHOCK MOUNTING

Solomon Musikant, Los Gatos, Calif., assignor to Vibradamp Corporation, Santa Clara, Calif., a corporation of California Application February 23, 1952, Serial No. 272,957

13 Claims. (Cl. 267—1)

This invention relates to a shock mounting or a spring mounting unit.

It is an object of the invention to provide a shock mounting or a spring mounting unit, utilizing glass fibers as the shock absorption material or spring element.

It is common in the art of shock absorption and resilient mountings to use metal springs, rubber, cork and felt for mountings to resiliently support various elements. However, the art of utilizing glass fibers for resilient mounting of structural members for absorption and dissipation of shock and for spring mountings has heretofore been undeveloped, except as disclosed in the copending application of Joachim Bush, Serial No. 268,049, filed January 24, 1952, now U. S. Patent No. 2,600,843, of common assignee with this application.

It is, therefore, an object of this invention to provide a shock absorption or spring mounting, utilizing glass fibers to absorb shock vibrations and support a structural element in a manner that the glass fibers will be effective in their resilient support and shock absorption along axes that are angular to one another.

It is another object of the invention to provide a resilient spring or shock absorption mounting, utilizing glass fibers as the supporting structure to resiliently carry the weight of the supported device and, also, for springingly absorbing vibrations of the supported structure angular to the direction of force of the applied load.

It is another object of the invention to provide a shock absorption or spring mounting, wherein the shock absorption or spring material consists of glass fibers of staple or continuous length variety bonded together and compressed to controlled density to give a specific resilience under the load factor imposed, the glass fibers being disposed in the material generally in a common direction, the shock absorption or spring unit consisting of separate coacting elements constructed of the glass fiber material with the glass fibers of the material in the several elements disposed angular to one another, whereby to absorb shock or secure springing support by the glass fiber material on shock axes that are angular and transverse of one another.

Further objects and advantages will become apparent from the drawings and the following description.

In the drawings:

Figure 1 is a horizontal cross-sectional view of a structure incorporating features of this invention.

Figure 2 is a perspective elevational view illustrating a use of a shock absorption or spring unit constructed in accordance with this invention.

Figure 3 is a chart illustrating the stabilization curve of the glass fibrous material used in the invention.

Figure 4 is a load deflection curve of the stabilized glass fibrous material.

The glass fiber shock absorbing material of which the spring unit of this invention is constructed is like that material disclosed in the copending application of Joachim Bush, Serial No. 268,049, filed Jan. 24, 1952, now Pat. No. 2,600,843, and produced according to the process disclosed therein. This shock absorbing or spring material constitutes a spring made of glass fibers, wherein the bonded glass fibers act as a multiplicity of cantilever springs for resilient support of a structural member with springing action and with shock absorption and dissipation.

As disclosed in the aforementioned application, the shock absorption or spring material is composed of glass fibers that may be produced in any one of several well-known devices by which the glass fibers are collected as a felted assemblage in the form of a mat or a pad. These glass fibers may be long continuous length fibers, or they can be short length staple fibers, or a mixture of them. Preferably, the glass fibers used in the shock absorption or spring material are those having a diameter of between 0.00005 and 0.00025 inch, commonly classified as "B" fiber in the glass fiber industry.

During the course of manufacture of the glass fibers, a binding material is applied to the fibers so that each of the fibers is coated with a binding agent when in the assemblage of glass fibers composing the glass fiber mat or pad. The binding agent is of a type that can be subsequently activated or reactivated to cause a bonding between the fibers at their points of juncture. A common binding agent used for this purpose is a phenol-formaldehyde resin.

However, other binding agents such as the various vinyl resins or styrene or silicon resins, or asphaltic compounds, can be used as the binding agent, depending entirely upon the class of use to which the material is placed. The binding agent can be either a thermosetting or a thermoplastic material, here again depending upon conditions of usage, particularly temperature conditions.

To produce the shock absorption or spring material used in this invention, continuous length or staple length glass fibers of the class heretofore described are brought into an assemblage in the form of a mat or pad. In the normal procedure of producing glass fibers in mat or pad form as collected upon an endless belt moving across the discharge opening of a collecting hood, the glass fibers assume a generally common direction of their disposition relative to one another in that they tend toward parallel arrangement, but due to felting effects of the fibers during the course of their laying down on the endless web on which they are collected, the assembled mat of glass fibers will have fibers disposed angular to one another and angular to the general direction of lay of the fibers, some of the fibers even being normal to the direction of lay.

The mat or assemblage of glass fibers collected on the endless web or belt contains the binder, preferably a phenol-formaldehyde resin in an unpolymerized condition and with the mat being of any desired thickness. It can be generally said that the glass fibers of the mat are positioned horizontally, considering the belt or web being so disposed during collection of the fibers.

The quantity of glass fiber that is brought together in a laminated assemblage is dependent upon the density of the glass fibrous material that is to be produced. It has been determined that by controlling the density of the glass fibrous material it is capable of resiliently supporting pressures of a very broad range, but that each density of the material will support pressures only within certain ranges resulting in various degrees of compression of the glass fibrous material. For example, a glass fibrous material having a density of 1 pound per cubic foot will support pressures of from 0.1 pound per square inch at 15% deflection to about 1.5 pounds per square inch at 75% deflection. Glass fibrous material having a density of 20 pounds per cubic foot will resiliently support pressures from about 100 pounds per square inch at 15% deflection to about 1600 pounds per square inch at 65% deflection.

The assemblage of glass fibrous material is then placed between pressure plates to compress the assemblage of glass fibers to the desired density, as for example from 1 pound to 20 pounds per square foot. Also, the determined density of the glass fibrous material is established when the material is at a desired thickness or height, dependent upon the dimensions desired in the finished product.

While the glass fibrous material is held to a desired density at a desired dimension between the pressure plates, the binding agent on the glass fibers is activated or reactivated to cause a bonding between the glass fibers at their various points of contact. Thus, when the pressure is released from the so-treated glass fibrous material it will retain the dimension at which it was compressed.

The so bonded glass fibrous material is then placed between other pressure plates which stress load the bonded glass fibrous material to compress it to an extent not less than that at which it will be compressed when supporting the maximum load to be imposed on the material. A number of such cold working compressions or deflections are given to the material to stabilize the resilience factor of the material. This loading or stressing of the bonded glass fibrous material is occasioned in the same direction as that which will be occasioned upon the material when the supported load is applied.

The effect of the stress loading or cold working of the glass fibrous material is to eliminate the effect of any glass fibers in the material that tend to resist deflection of the material and to fracture those glass fibers that are improperly disposed in the material for cooperative resilient support of the load that is to be imposed on the material.

This stress loading of the glass fibrous material is effective to break or fracture the glass fibers that are improperly disposed in the glass fibrous material to the extent that they cannot flex to the extent required by the deflection of the material under the load to be applied. Such fibers will fracture or break and leave only the fibers that cooperate to support the load. This action of removing the fibers that tend to resist resilient action of the fibrous material results in stabilizing the resilience factor of the glass fibrous material.

For example, in Figure 3 there is illustrated a chart showing the result of cold working or compression cycling of the bonded glass fibrous material. The material tested consisted of bonded glass fibrous material of a density of 6 pounds per cubic foot which was compressed to 50% of its initial height and is to carry full load at 40% deflection. Normally cycling or cold working is carried 10% beyond the maximum deflection of the material under maximum load to stabilize the resilience value of the material under full load conditions.

As represented in the chart, it will be seen that the initial compression of the material to 50% of its initial height required a load of about 16 pounds per square inch. After the first two compression cycles the load required to compress the material to 50% of its height reduced to about 8 pounds per square inch. It will thus be seen that the maximum degree of stabilization of the resilience factor is obtained in the initial loadings or compression stressings of the material.

Thereafter, up to the first ten cycles of stress loadings the pressure required for loading changes only a minor amount, the pressure loading being reduced from about 8 pounds per square inch to slightly over 7 pounds per square inch. At this point the glass fibrous material is sufficiently stabilized that it can be said to be stabilized for all practical purposes. However, in the event for the need of extreme accuracy for the stabilization of the resilience factor, the material can be cycled an additional number of times until at about fifty cycles of stress loadings the product becomes fully stabilized for all practical purposes, even of extreme accuracies.

The stabilized product is now capable of producing repeat performance of spring loading with both a compression and extension of the material following substantially the same rate curve as shown by the typical load deflection curve of Figure 4. The amplitude of vibration absorption is regulated by the hysteresis loop shown on the load deflection curve. By varying the density of the material for a given load to be supported, and thereby varying the degree of compression or deflection of the material, various load deflection curves may be obtained with varying curve shapes on the hysteresis loop to secure the desired control over the amount of energy absorbed by the material in its deflection.

The load deflection curve of Figure 4 is that of a stabilized material of 6 pounds per cubic foot density under a maximum of 45% deflection stabilized by cold working or stress loading ten times. The original free height of the material being 0.999 inch, with the new free height after stress loading and stabilization being 0.994 inch.

The assemblage of the glass fibers coated with phenol-formaldehyde resin is a combination of 5% to 25% phenol-formaldehyde and 95% to 75% glass fibers, with the preferred product containing 15% phenol-formaldehyde and 85% glass fibers. The phenol-formaldehyde used as a binder is preferably of from 97% to 40% by weight of phenol, and 3% to 60% by weight of formaldehyde.

In curing the phenol-formaldehyde resin, for example, the glass fibrous material is heated to a temperature of about 300° F., but which can be varied from about 250° F. to 450° F. There is a loss of about 8% by weight of the phenol product during curing.

In Figures 1 and 2 there is illustrated a resilient springing device incorporating the glass fiber material heretofore described, the glass fiber material being so disposed in the springing device or shock absorption device as to absorb movements in different directions, the glass fibers of the shock absorbing or springing elements of the device being arranged with their axis of compression angular or normal to the lay of the fibers, which lay of the fibers is normal to the axis of compression.

The springing or shock absorption unit 10 consists of a cylindrical cage 11 that is composed of two parts 11a and 11b. The cage part 11a is secured to a threaded stud 12 onto which the cage part 11b is threadedly received by the ring 13. The device or apparatus to be supported 14 has a projecting ring 15 which receives the stud 12 so that the cage parts 11a and 11b are on opposite sides of the ring 15. A spindle 16 extends from a stationary support 14' and is positioned within the cage 10.

A glass fiber shock absorbing element 17 is placed between the central portion of the spindle 16 and the stud 12 to support the article 14 in a vertical direction of movement that is transverse of the axis of the spindle. The lay of the glass fibers in the element 17 is generally parallel to the axis of the spindle so that the axis of compression of the element 17 is transverse of the spindle 16. Thus, absorbing relative movement between the spindle and the cage that is transverse of the spindle.

At each end of the spindle 16 there is provided a glass fiber shock absorbing element 18, this element being retained between the washers 19 shouldered on the enlarged central portion 20 of the spindle 16 and the washer 21 that bears against the end of the cage 10.

The glass fiber shock absorbing elements 18 are provided to absorb axial relative movement between the spindle 16 and the cage 10, each of the elements 18 acting as a spring. The elements 18 have the same degree of compression to thus provide a balanced condition upon the spindle 16.

The lay of the glass fibers in the elements 18 is generally transverse of the spindle 16 so that the axis of compression of these elements is axial of the spindle 16.

The shock absorbing structure 17 also includes the glass fiber shock absorbing elements 25 that enclose the elements 18. The annular elements 25 have the lay of the glass fibers parallel with the lay of the fibers in the element 17, and substantially parallel to the axis of the spindle 16. Thus, the axis of compression of the elements 25 is transverse of the spindle 16.

The elements 25 enclose the elements 18 to support the elements 18 since the transverse shear strength of the glass fiber shock absorbing material is relatively weak, that is, the shear in the plane of the lay of the fibers is not sufficiently great to allow for the reception of large shear stresses on the shock absorbing material. Thus, the glass fiber shock absorbing members 25 support the elements 18 and resist shear action on these elements. Preferably, sleeves 26 separate the elements 25 and 18 to provide for freedom of action of these elements.

A shock pad 30 of the glass fiber shock absorbing material can be placed in one end of the cage 10 in the event excessive shock is to be accepted in one direction of axial movement of the cage 10.

While the apparatus disclosed and described illustrates a preferred form of the invention, yet it will be understood that those modifications that fall within the scope of the appended claims are intended to be included herein.

I claim:

1. In a resilient springing shock-absorbing device comprising glass fibers arranged in a plurality of separately acting bodies with each of the bodies comprising glass fibers assembled together in a felted condition, means for retaining said glass fibers in said condition and providing a spring structure with the fibers bonded together at a compressible density, the improvement that consists of having at least one body of glass fibers disposed with the lay of the fibers substantially normal to a first compression axis and a second body of glass fibers disposed with the lay of the fibers substantially normal to a second axis of compression, said axes of compression being angular to one another.

2. In a resilient springing shock-absorbing device using glass fibers arranged in a plurality of separately acting bodies with each of the bodies comprising glass fibers assembled together in a felted condition, means for retaining said glass fibers in said condition and providing a spring structure with the fibers bonded together at a compressible density, the improvement that consists of having at least one body of glass fibers disposed with the lay of the fibers substantially normal to a first compression axis, and a second body of glass fibers disposed with the lay of the fibers substantially normal to a second axis of compression, said axes of compression being angular to one another, said bodies being so disposed relative to one another that one at least partially encloses the other for support thereof transversely of the axis of compression applied thereon.

3. In a resilient springing shock-absorbing device comprising glass fibers assembled together in a felted condition, means for retaining said glass fibers in said condition and providing a spring structure with the fibers bonded together at a compressible density with those fibers disposed therein incapable of cooperative resilient support of a load on an established load axis relative to the body of glass fibers being fractured, whereby to eliminate the non-cooperative fibers, the improvement consists of having a first body of glass fibers disposed with the established load axis thereof parallel with a first load axis of a device to be supported, and a second body of glass fibers disposed with the established load axis thereof parallel to a second load axis of the device to be supported, the said load axes of the said device being angular to one another.

4. In a resilient springing device, a spindle, an assemblage comprising superimposed layers of glass fibers assembled together in a felted condition and operatively connected to said spindle, said fibers being bonded together at a compressible density with those fibers disposed therein incapable of cooperative resilient support of a load on an established load axis relative to the body of glass fibers being fractured, whereby to eliminate the non-cooperative fibers, said glass fiber assemblage comprising, a first body of glass fibers disposed with the established load axis thereof parallel with a first load axis of a device to be supported, and said assemblage comprising a second body of glass fibers disposed with the established load axis thereof parallel to a second load axis of the device to be supported, the said load axes of the said device being angular to one another, the said bodies of glass fibers being positioned relative one to the other that one at least partially encloses the other for support thereof transversely of the established load axis of the body so enclosed.

5. In a resilient springing device for supporting apparatus, the combination of, a cage, a spindle in said cage, a first resilient spring element arranged in said cage and about said spindle, said spring element being composed of an assemblage of glass fibers bonded together as a compressible assemblage with those fibers disposed in the assemblage incapable of supporting a load on a given load axis relative to the assemblage fractured, and a second resilient spring structure arranged in said cage and about said spindle, said second spring structure being composed of a compressible assemblage with those fibers disposed in the assemblage incapable of supporting a load on a given load axis relative to the assemblage fractured, said glass fiber spring members being spaced longitudinally of said spindle and with their load axes angular to one another.

6. In a resilient springing device for supporting apparatus, the combination of, a cage, a spindle in said cage, a first resilient spring element arranged between said spindle and said cage, said spring element being composed of an assemblage of glass fibers bonded together as a compressible assemblage with those fibers disposed in the assemblage incapable of supporting a load on a given load axis relative to the assemblage fractured, and a second resilient spring structure arranged between said spindle and said cage, said second spring structure being composed of a compressible assemblage with those fibers disposed in the assemblage incapable of supporting a load on a given load axis relative to the assemblage fractured, said members being positioned with their load axes normal to one another.

7. In a resilient springing device, the combination of, a cage, a spindle within said cage, a first resilient structure between said spindle and said cage for absorbing a first relative movement therebetween, and a second resilient structure between said spindle and said cage for absorbing a second relative movement therebetween, said movements being angular to one another, each of said supporting structures being composed of a compressible assemblage of glass fibers bonded together and compressible on an established axis of compression with those fibers incapable of accepting the compression on the given compression axis fractured, the compression axis of each of said supporting structures being parallel with the respective direction of movement between said spindle and said cage supported thereby.

8. In a resilient springing device, the combination of, a cage, a spindle within said cage, a first glass fiber shock absorbing structure between said spindle and said cage to absorb relative movement therebetween in a first direction, and a second glass fiber shock absorbing structure between said spindle and said cage for absorbing relative movement therebetween in a second direction, each of said glass fiber shock absorbing structures being composed of a compressible assemblage of glass fibers bonded together and compressible on an established axis of compression with those fibers incapable of accepting the compression on the given compression axis fractured, the compression axis of each of said supporting structures being parallel with the respective direction of movement between said spindle and said cage supported thereby.

9. In a resilient springing device, the combination of, a cage, a spindle within said cage, a first glass fiber shock absorbing structure between said spindle and said cage to absorb relative movement therebetween transversely of said spindle, and a second glass fiber shock absorbing structure between said spindle and said cage for absorbing relative movement therebetween axial of said spindle, each of said glass fiber shock absorbing structures being composed of a compressible assemblage of glass fibers bonded together and compressible on an established axis of compression with those fibers incapable of accepting the compression on the given compression axis fractured, the compression axis of each of said supporting structures being parallel with the respective direction of movement between said spindle and said cage supported thereby.

10. In a resilient springing device, the combination of, a cage, a spindle within said cage, a first glass fiber shock absorbing structure between said spindle and said cage to absorb relative movement therebetween transversely of said spindle, and a second glass fiber shock absorbing structure between said spindle and said cage for absorbing relative movement therebetween axial of said spindle, each of said glass fiber shock absorbing structures being composed of a compressible assemblage of glass fibers bonded together and compressible on an established axis of compression with those fibers incapable of accepting the compression on the given compression axis fractured, the compression axis of each of said supporting structures being parallel with the respective direction of movement between said spindle and said cage supported thereby, said first glass fiber shock absorbing structure at least partially enclosing said second structure for support thereof transversely of the compression axis of the said second structure.

11. A resilient springing device comprising an assemblage of superimposed layers of glass fibers assembled together in a felted condition, means for retaining said glass fibers in said condition and providing a spring structure with the fibers bonded together at a compressible density, said glass fiber spring structure comprising one body of glass fibers disposed in spaced relationship to a second body of glass fibers, said glass fibers being disposed so that the lay of the fibers in the first body is angular to the lay of the fibers in the second body.

12. A resilient springing device comprising a unitary structure composed essentially of glass fibers assembled together in a felted condition, means for retaining said glass fibers in said condition and providing a spring structure with the fibers bonded together at a compressible density, said glass fiber spring structure comprising one body of glass fibers disposed in spaced relationship relative to a second independently acting body of glass fibers, the lay of the fibers in said first body being angular to the lay of the fibers in said second body.

13. In a resilient springing shock-absorbing device comprising glass fibers assembled together and retained in a felted condition by means forming a spring structure with the fibers bonded together at a compressible density, the improvement that consists of having one body of glass fibers disposed with the lay of the fibers angular to the load axis applied thereon and a second body of glass fibers spaced from said first body of fibers and with the lay of the glass fibers angular to the lay of the fibers in the first body and angular to a second load axis applied thereon, said load axes being angular to one another.

References Cited in the file of this patent

UNITED STATES PATENTS

| Number | Name | Date |
|---|---|---|
| 2,184,326 | Thomas | Dec. 26, 1939 |
| 2,331,146 | Slayter | Oct. 5, 1943 |

FOREIGN PATENTS

| Number | Country | Date |
|---|---|---|
| 589,383 | Great Britain | June 19, 1947 |